(12) United States Patent
Konishi et al.

(10) Patent No.: US 11,214,441 B2
(45) Date of Patent: Jan. 4, 2022

(54) BAND-SHAPED BELT, ENDLESS BELT, AND METHOD FOR MANUFACTURING SAME

(71) Applicant: NITTA CORPORATION, Osaka (JP)

(72) Inventors: Yoshihiro Konishi, Yamatokoriyama (JP); Takeshi Kubota, Yamatokoriyama (JP); Akito Oi, Yamatokoriyama (JP); Akihiko Kuriya, Yamatokoriyama (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 16/765,793

(22) PCT Filed: Sep. 27, 2018

(86) PCT No.: PCT/JP2018/036081
§ 371 (c)(1),
(2) Date: May 20, 2020

(87) PCT Pub. No.: WO2019/102713
PCT Pub. Date: May 31, 2019

(65) Prior Publication Data
US 2020/0283232 A1 Sep. 10, 2020

(30) Foreign Application Priority Data

Nov. 21, 2017 (JP) .............................. JP2017-223954
Sep. 18, 2018 (JP) .............................. JP2018-174283

(51) Int. Cl.
*B65G 15/34* (2006.01)
*B65G 15/36* (2006.01)
(Continued)

(52) U.S. Cl.
CPC ............. *B65G 15/34* (2013.01); *B29D 29/06* (2013.01); *B65H 5/02* (2013.01); *F16G 3/10* (2013.01);
(Continued)

(58) Field of Classification Search
None
See application file for complete search history.

(56) References Cited

U.S. PATENT DOCUMENTS 3,471,352 A * 10/1969 Andrew .................. B29C 35/12
156/273.3
3,992,958 A * 11/1976 Bonnefon .............. B29D 29/00
474/238
(Continued)

FOREIGN PATENT DOCUMENTS

EP    2327544 A1   6/2011
GB    1201298 A    8/1970
(Continued)

OTHER PUBLICATIONS

The extended European search report of the corresponding EP application No. 18881538.5 dated Jul. 8, 2021.

*Primary Examiner* — Kavel Singh
(74) *Attorney, Agent, or Firm* — Muncy, Geissler, Olds & Lowe, P.C.

(57) ABSTRACT

An endless belt includes a band-shaped belt main body made of a vulcanized rubber, and a coupling part that is made of a thermoplastic resin and is provided between both end parts of the belt main body, wherein the vulcanized rubber of the both end parts of the belt main body and the thermoplastic resin of the coupling part are chemically bonded to each other.

14 Claims, 8 Drawing Sheets

(51) Int. Cl.
*B65G 15/30* (2006.01)
*B29D 29/06* (2006.01)
*B65H 5/02* (2006.01)
*F16G 3/10* (2006.01)
*B29K 101/12* (2006.01)

(52) U.S. Cl.
CPC ...... *B29K 2101/12* (2013.01); *B65G 2207/02* (2013.01)

(56) References Cited

U.S. PATENT DOCUMENTS

| | | | |
|---|---|---|---|
| 6,087,519 A * | 7/2000 | Garnier | C08K 9/04 556/419 |
| 6,234,304 B1 * | 5/2001 | DeGroot | B29C 66/4324 198/844.2 |
| 8,002,110 B2 * | 8/2011 | DeGroot | B65G 15/32 198/844.2 |
| 9,090,022 B1 * | 7/2015 | van't Schip | B29C 65/7841 |
| 2002/0187869 A1 | 12/2002 | Martin et al. | |
| 2013/0277179 A1 * | 10/2013 | Teranishi | B65G 23/06 198/834 |
| 2017/0204937 A1 | 7/2017 | Marchetti | |

FOREIGN PATENT DOCUMENTS

| | | |
|---|---|---|
| JP | 2005504931 A | 2/2005 |
| JP | 2005-153318 A | 6/2005 |
| JP | 2006-44077 A | 2/2006 |
| JP | 2010-120378 A | 6/2010 |
| JP | 2012-36957 A | 2/2012 |
| JP | 2016-038010 A | 3/2016 |

\* cited by examiner

BAND-SHAPED BELT, ENDLESS BELT, AND METHOD FOR MANUFACTURING SAME

TECHNICAL FIELD

The present invention relates to a band-shaped belt, an endless belt, and a method for manufacturing the same.

BACKGROUND ART

The endless belt is used as a conveyance belt in a conveyance device of a financial terminal device, an automatic ticket gate, a ticket vending machine, and the like. As the endless belt, for example, belts made of a reinforcement material such as a fiber material (for example, knitted fabric), and a thermosetting resin such as a rubber are disclosed (for example, PTL 1).

CITATION LIST

Patent Literature

PTL 1: JP-A-2016-038010

SUMMARY OF THE INVENTION

Technical Problem

For example, to replace the endless belt that is used in the conveyance device of the automatic ticket gate, it is necessary to detach the conveyance device from the automatic ticket gate once, and to attach the conveyance device to the automatic ticket gate again after belt replacement, and thus a long work time is necessary, and work becomes complicated. In a case where the endless belt is attached to the conveyance device in a state of being cut into a band shape, and the belt can be returned to an endless shape, it is possible to simplify belt replacement work. However, in an endless belt that can be used in the conveyance device as disclosed in PTL 1, the thermosetting resin is used as a main material. Accordingly, a bonding part for joining parts of the thermosetting resin is necessary to join the endless belt again after cutting the endless belt once, and thus there is a problem that work becomes complicated.

It is necessary for the conveyance device to be stopped during belt replacement when replacing the endless belt that is used in the conveyance device. Accordingly, it is desired that a belt replacement work time is as short as possible. In addition, in a belt after replacement which is set to an endless shape by fusing a thermoplastic resin, there is a concern that a boundary line between a thermosetting resin and a thermoplastic resin deteriorates earlier, and durability is inferior in comparison to a seamless belt that is formed by the thermosetting resin.

An object of the invention is to provide a band-shaped belt, an endless belt, and a method for manufacturing the same with which joining can be easy at a working site where a belt is used, and which are capable of suppressing a reduction in durability.

Solution to Problem

According to an aspect of the invention, there is provided a method for manufacturing a band-shaped belt. The method includes: a stacked body forming process of disposing a band-shaped thermoplastic resin sheet that is made of a thermoplastic resin and serves as a coupling part, and an unvulcanized rubber sheet that includes an unvulcanized rubber and a crosslinking agent covalently bonded to the unvulcanized rubber and the thermoplastic resin and serves as a belt main body on a mold surface in a state in which end parts are in contact with each other to obtain an unvulcanized stacked body; and a vulcanization-molding process of vulcanization-molding the unvulcanized stacked body.

According to another aspect of the invention, there is provided a method for manufacturing an endless belt. The method includes a process of mounting a band-shaped belt on a conveyance device, and fusing a first coupling part and a second coupling part into an endless shape.

According to still another aspect of the invention, there is provided a band-shaped belt including: a band-shaped belt main body made of a vulcanized rubber; a first coupling part that is provided in one end of the belt main body; and a second coupling part that is provided in the other end of the belt main body. The band-shaped belt is obtained by vulcanization-molding at least one thermoplastic resin sheet that is made of a thermoplastic resin and serves as the first coupling part and the second coupling part, and an unvulcanized rubber sheet that includes an unvulcanized rubber and a crosslinking agent covalently bonded to the unvulcanized rubber and the thermoplastic resin and serves as the belt main body in a state in which end parts of the thermoplastic resin sheet and end parts of the unvulcanized rubber sheet are in contact with each other.

According to still another aspect of the invention, there is provided an endless belt including: a band-shaped belt main body made of a vulcanized rubber; and a coupling part that is provided between both end parts of the belt main body. The endless belt is obtained by vulcanization-molding a thermoplastic resin sheet that is made of a thermoplastic resin and serves as the coupling part, and an unvulcanized rubber sheet that includes an unvulcanized rubber and a crosslinking agent covalently bonded to the unvulcanized rubber and the thermoplastic resin and serves as the belt main body in a state in which end parts of the thermoplastic resin sheet and end parts of the unvulcanized rubber sheet are in contact with each other.

Advantageous Effects of the Invention

According to the invention, since a joining part is provided in advance in the belt main body, it is possible to obtain an endless belt by performing joining at one part, and thus the band-shaped belt can be easily joined at a working site where the band-shaped belt is used. Since the thermoplastic resin and the vulcanized rubber are chemically bonded to each other, the coupling part and the belt main body are more strongly coupled to each other. Accordingly, the band-shaped belt and the endless belt can reduce deterioration of durability.

BRIEF DESCRIPTION OF THE DRAWINGS

FIG. 3 is a perspective view illustrating a winding process in a method for manufacturing the endless belt.

FIG. 8 is a cross-sectional view illustrating a sample that is used in a tensile test.

FIG. 9 is a partial cross-sectional view that is used for description of a second embodiment.

FIG. 10 is a partial cross-sectional view that is used for description of a third embodiment.

DESCRIPTION OF EMBODIMENTS

Hereinafter, embodiments of the invention will be described in detail with reference to the accompanying drawings.

1. First Embodiment

Whole Configuration

Figure 1:
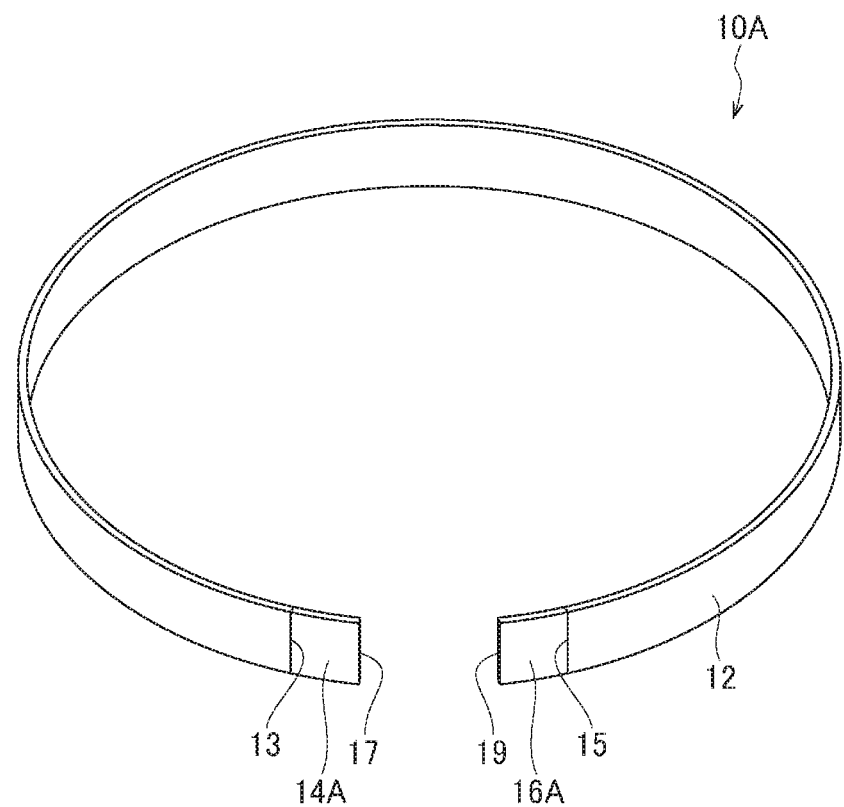
FIG. 1 is a perspective view illustrating a band-shaped belt according to a first embodiment.

A band-shaped belt 10A illustrated in FIG. 1 is a flat belt of which a surface is flat and is not set to an endless shape yet. The band-shaped belt 10A includes a belt main body 12, a first coupling part 14A that is provided in a first end surface 13 that is one end of the belt main body 12 in a longitudinal direction, and a second coupling part 16A that is provided in a second end surface 15 that is the other end of the belt main body 12 in the longitudinal direction. The belt main body 12 is a band-shaped member made of a vulcanized rubber, for example, millable urethane, hydrogenated nitrile rubber (H-NBR), an ethylene propylene diene rubber (EPDM), an ethylene propylene rubber (EPM), or chlorosulfonated polyethylene. In the case of this embodiment, both a joining surface between the first end surface 13 and the first coupling part 14A, and a joining surface between the second end surface 15 and the second coupling part 16A are flat. Both a first tip end part 17 that is a tip end of the first coupling part 14A, and a second tip end part 19 that is a tip end of the second coupling part 16A are flat.

The first coupling part 14A and the second coupling part 16A are plate-shaped members made of a thermoplastic resin, for example, a urethane elastomer, a polyamide elastomer, a polyester elastomer, a polyvinyl chloride-based elastomer, or a polyolefin-based elastomer. A width length of the first coupling part 14A and the second coupling part 16A is the same as a width length of the belt main body 12.

The vulcanized rubber of the first end surface 13 and the second end surface 15, and the thermoplastic resin of the first coupling part 14A and the second coupling part 16A are chemically bonded, and thus the first end surface 13 and the second end surface 15 are more strongly coupled to the first coupling part 14A and the second coupling part 16A, respectively, in comparison to joining by heat fusion.

Figure 2:
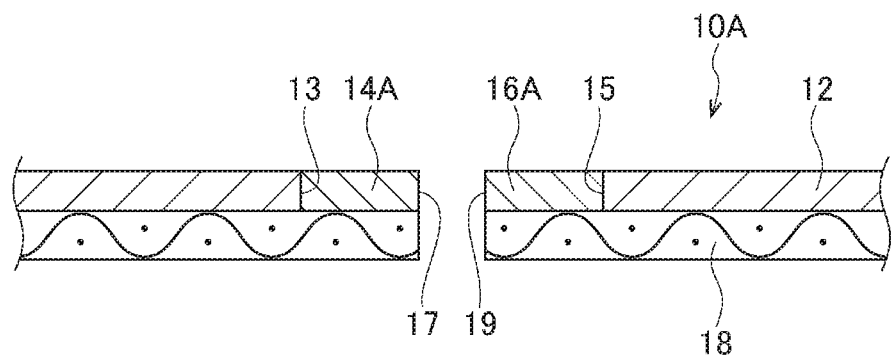
FIG. 2 is an enlarged longitudinal cross-sectional view of end parts of the band-shaped belt according to the first embodiment.

As illustrated in FIG. 2, the band-shaped belt 10A includes reinforcement fabric 18, and the belt main body 12, the first coupling part 14A coupled to the first end surface 13 of the belt main body 12, and the second coupling part 16A coupled to the second end surface 15 are stacked on the reinforcement fabric 18. The band-shaped belt 10A is formed in two layers as a whole. Specifically, the reinforcement fabric 18 is disposed on one surface, and the belt main body 12, the first coupling part 14A, and the second coupling part 16A are disposed on the other surface. The reinforcement fabric 18 is configured to impart durability to the band-shaped belt 10A. Examples of a material of the reinforcement fabric 18 include woven or knitted fabric such as polyester fiber, nylon fiber, aramid fiber, glass fiber, carbon fiber, and cotton. The thickness of the fiber that forms the reinforcement fabric is not particularly limited, and is, for example, approximately 70 T to 280 T (decitex).

Manufacturing Method

Next, a method for manufacturing the band-shaped belt 10A and an endless belt will be described. First, a rubber composition that is a raw material of the belt main body 12 is prepared. An unvulcanized rubber to be a vulcanized rubber and a crosslinking agent that covalently bonded to the unvulcanized rubber and the thermoplastic resin are mixed by adding a hydrolysis inhibitor and other additives thereto as necessary. An unvulcanized rubber sheet is manufactured with a calendar apparatus by using the rubber composition obtained as described above. A size of the unvulcanized rubber sheet is adjusted to a size of a reinforcement sheet to be described later. Here, the covalent bond represents a bond in which two atoms share an electron, and represents a bond having a sigma bond and/or a pi bond. More specifically, the crosslinking agent covalently bonds to a functional group of the unvulcanized rubber and a functional group of the thermoplastic resin.

As the crosslinking agent, peroxides, for example, dicumyl peroxide, tertiary butyl peroxide, tertiary-butyl cumyl peroxide, 1,1-di(tertiary-butyl peroxy)-3,3,5-trimethylcyclohexane, 2,5-dimethyl-2,5-di(tertiary-butyl peroxy)hexane, 2,5-dimethyl-2,5-di(tertiary-butyl peroxy)hexine-3, 1,3-di(tertiary-butyl peroxy isopropyl)benzene, 2,5-dimethyl-2,5-di(benzoylperoxy)hexane, tertiary-butyl peroxy benzoate, tertiary-butyl peroxy isopropyl carbonate, or n-butyl-4,4-di(tertiary-butyl peroxy)valerate can be used. In an unvulcanized rubber sheet 26, it is preferable that a blending amount of the crosslinking agent is set to 2 to 10 parts by weight with respect to 100 parts by weight of the unvulcanized rubber.

Figure 3A:
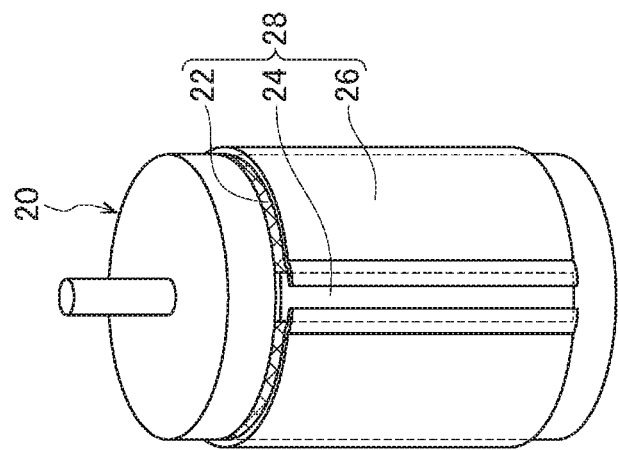
FIG. 3A is a view illustrating a step in which a reinforcement sheet is wound.
Figure 3B:
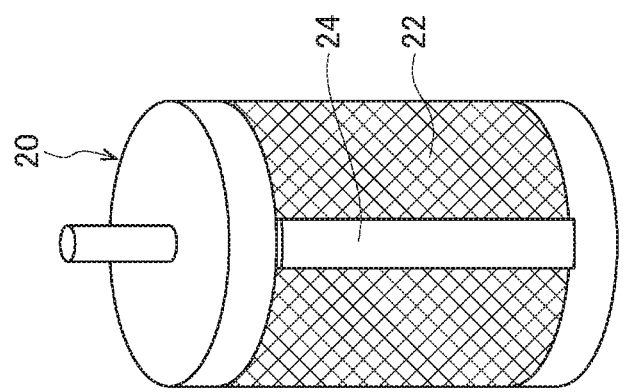
FIG. 3B is a view illustrating a step in which a thermoplastic resin sheet is disposed.

Next, a reinforcement sheet 22 serving as the reinforcement fabric 18 is wound on a surface of a cylindrical drum 20 as a mold (FIG. 3A). The reinforcement fabric 18 has an endless shape and a size (circumferential length) that does not come off the mold. Next, a band-shaped thermoplastic resin sheet 24 that is made of the thermoplastic resin and serves as the first coupling part 14A and the second coupling part 16A is disposed on a surface of the reinforcement sheet 22 in an axial direction of the drum 20 (FIG. 3B).

Figure 3C:
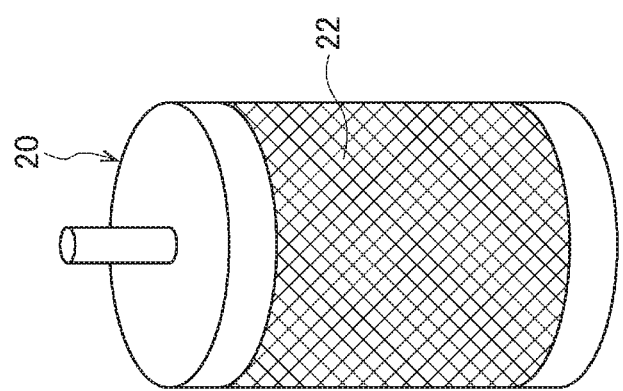
FIG. 3C is a view illustrating a step in which an unvulcanized rubber sheet is wound.

Next, the unvulcanized rubber sheet 26 is wound to form an unvulcanized stacked body 28 (FIG. 3C). The unvulcanized rubber sheet 26 is disposed on the reinforcement sheet 22 and on the same surface as in the thermoplastic resin sheet 24. It is not necessary for the unvulcanized rubber sheet 26 to completely cover a surface of the thermoplastic resin sheet 24 as long as the unvulcanized rubber sheet 26 covers the reinforcement sheet 22 that is exposed in a circumferential direction, and is in contact with end parts of the thermoplastic resin sheet 24 in a width direction. In the case of this drawing, end parts of the unvulcanized rubber sheet 26 are disposed to overlap the end parts of the thermoplastic resin sheet 24 in the width direction. Here, the end parts include an end surface and a constant region in a direction perpendicular to the end surface.

Figure 4:
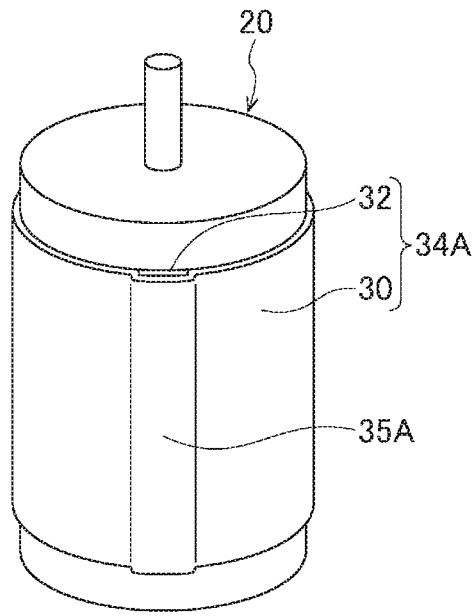
FIG. 4 is a perspective view illustrating a vulcanized stacked body obtained in a vulcanization-molding process in the method for manufacturing the endless belt.

Next, the unvulcanized stacked body 28 is vulcanization-molded under heating and pressing conditions. For example, a heating temperature may be set to approximately 150° C. to 180° C. After passage of a predetermined time, cooling is performed to obtain a vulcanized stacked body 34A including a coupling layer 32 solidified from the thermoplastic resin and a belt main body layer 30 solidified from the vulcanized rubber on the reinforcement sheet 22 (not illustrated in the drawing) as illustrated in FIG. 4. In the vulcanized stacked body 34A, the unvulcanized rubber sheet 26 is vulcanized by the crosslinking agent, and the vulcanized rubber and the thermoplastic resin are chemically bonded to each other through the crosslinking agent. In the vulcanized stacked body 34A, a protruding ridge 35A that protrudes in a radial direction over an axial direction is formed at a part where the coupling layer 32 is provided.

Figure 5:
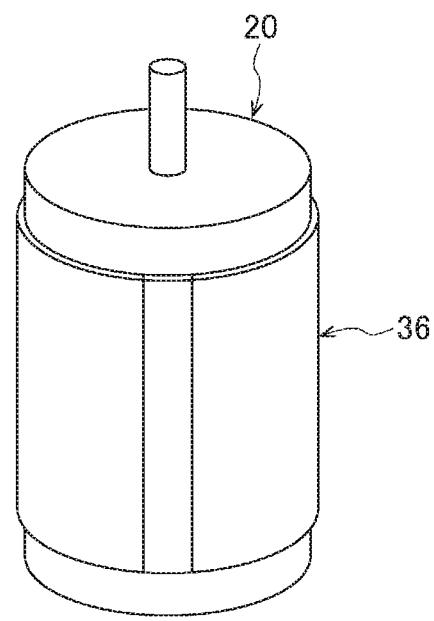
FIG. 5 is a perspective view illustrating a vulcanized stacked body after a polishing process in the method for manufacturing the endless belt.
Figure 6:
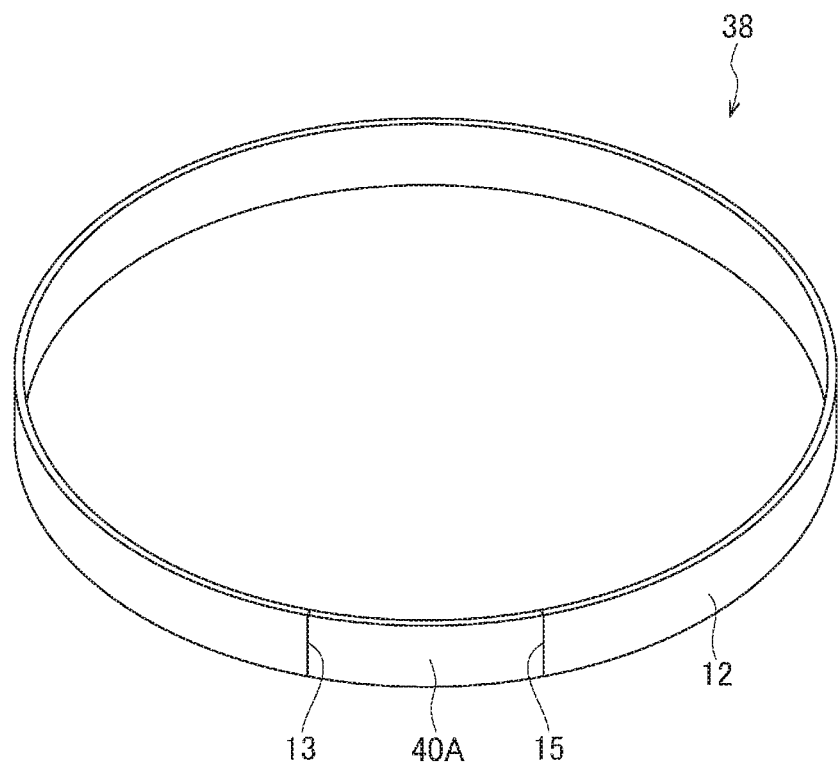
FIG. 6 is a perspective view illustrating the endless belt according to the first embodiment.

Next, an outer periphery of the vulcanized stacked body 34A is polished to remove the protruding ridge 35A (FIG. 5). By cutting out a vulcanized stacked body 36 obtained as described above with a predetermined width in an annular shape, an endless belt 38 illustrated in FIG. 6 can be obtained. In the endless belt 38, the first end surface 13 and the second end surface 15 of the belt main body are coupled through a coupling part 40A. The endless belt 38 obtained as described above is referred to as a primary endless belt.

In the primary endless belt, when cutting out the coupling part 40A in a thickness direction to separate the coupling part 40A into the first coupling part 14A and the second coupling part 16A, the band-shaped belt 10A illustrated in FIG. 1 is obtained. In the band-shaped belt 10A, any surface of the belt main body 12 and the reinforcement fabric 18 may be used a belt surface (for example, a conveyance surface in the case of being used as a conveyance belt).

Use Method

Next, a method of forming the band-shaped belt 10A as an endless belt will be described. First, in a state in which the first tip end part 17 and the second tip end part 19 come into contact with each other, the first end surface 13 and the second end surface 15 are disposed on an upper surface of a lower mold (not illustrated). The first coupling part 14A and the second coupling part 16A are disposed in a state in which the first tip end part 17 and the second tip end part 19 come into contact with each other or partially overlap each other in a thickness direction. Next, an upper mold is disposed on the first coupling part 14A and the second coupling part 16A, and heating is performed while performing pressing for a certain time in the thickness direction by a pressing body (not illustrated). In this case, the first coupling part 14A and the second coupling part 16A are melted and fluidized.

Figure 7:
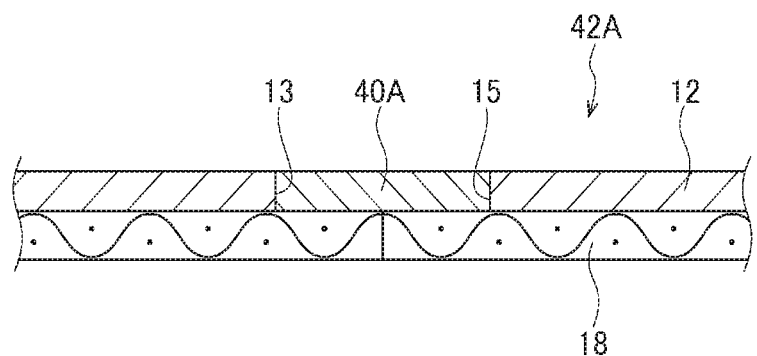
FIG. 7 is an enlarged longitudinal cross-sectional view of a coupling part in a case where the band-shaped belt according to the first embodiment is set as the endless belt.

Next, when the lower mold and the upper mold are cooled down, the first coupling part 14A and the second coupling part 16A are solidified, and the coupling part 40A is formed as illustrated in FIG. 7. As described above, the first end surface 13 and the second end surface 15 are coupled through the coupling part 40A, and thus an endless belt 42A is formed. As illustrated in FIG. 7, the first coupling part 14A and the second coupling part 16A are fused and integrated into the coupling part 40A. The reinforcement fabric 18 is integrated by fusing the permeating thermoplastic resin of the first coupling part 14A and the second coupling part 16A.

As described above, the first coupling part 14A and the second coupling part 16A can be integrated again by bringing the first tip end part 17 and the second tip end part 19 into contact with each other and fusing the end parts. In this way, the endless belt 42A formed by integrating again the first coupling part 14A and the second coupling part 16A, which are separated once from each other, with each other to obtain the coupling part 40A is referred to as a secondary endless belt (FIG. 7). The primary endless belt and the secondary endless belt are common in that the first end surface 13 and the second end surface 15 of the belt main body 12 are coupled through the coupling part 40A.

Operation and Effect

In the case of this embodiment, since the first coupling part 14A and the second coupling part 16A are provided in advance in the belt main body 12, it is possible to obtain the endless belt 42A by coupling the first coupling part 14A and the second coupling part 16A at one part. Accordingly, a coupling part can be set to one part, and thus the band-shaped belt 10A can be easily joined at a working site where the band-shaped belt 10A is used.

Since the thermoplastic resin and the vulcanized rubber are chemically bonded to each other, the coupling part 40A and the belt main body 12 are more strongly coupled. Accordingly, the endless belt 42A can suppress a reduction in durability.

Since the reinforcement fabric 18 is bonded to the thermoplastic resin of the coupling part 40A, the coupling part 40A and the belt main body 12 are more strongly coupled to each other.

Figure 8A:
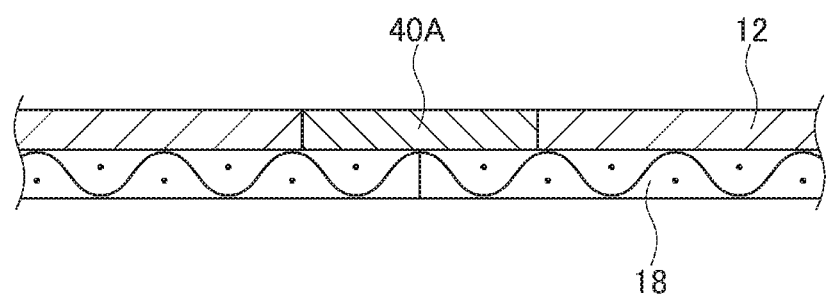
FIG. 8A illustrates an example.

An endless belt having a cross-sectional shape illustrated in FIG. 8A was prepared in the same procedure as in the manufacturing method, and a tensile strength was measured. As the reinforcement fabric 18, endless knitted fabric made of polyester fiber was used. As for the belt main body 12, millable urethane as the unvulcanized rubber and 4.0 parts by weight of dicumyl peroxide as the crosslinking agent with respect to 100 parts by weight of millable urethane were blended. With regard to the coupling part 40A, thermoplastic polyurethane was used as the thermoplastic resin. Vulcanization was performed at 170° C. to prepare an endless belt having a thickness of 0.8 mm, a width of 10 mm, a circumferential length of 350 mm, and a length of 100 mm in a belt longitudinal direction of the coupling part 40A.

Figure 8B:
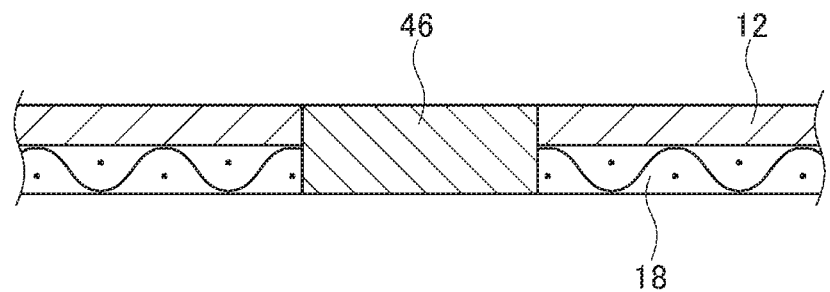
FIG. 8B illustrates a comparative example.

As comparison, an endless belt having a cross-sectional shape illustrated in FIG. 8B was prepared. The endless belt of a comparative example uses the same material as in the endless belt according to the example, and includes the reinforcement fabric 18 and the belt main body 12 that is provided on the reinforcement fabric 18 and is made of the vulcanized rubber. End parts of the belt main body 12 and the reinforcement fabric 18 are joined by a fused part 46. The end parts of the belt main body 12 and the fused part 46 are joined by heating and melting, and cooling and solidifying the thermoplastic resin sheet 24 disposed between end parts of the belt main body 12 after vulcanization. Accordingly, the vulcanized rubber of the belt main body 12 and the thermoplastic resin of the fused part 46 are not chemically bonded to each other.

In a rupture test, a tensile tester (Autograph AGS-2000B manufactured by SHIMADZU CORPORATION) was used. A rupture strength when drawing an endless belt sample by the tensile tester in a longitudinal direction at a constant tensile speed was measured by a road cell having a capacity of 1 kN. In the case of the example, the tensile speed was set to be constant at 350 mm/min. In the case of the comparative example, the tensile speed was set to 26.3 mm/min up to a displacement of 50 mm, and 263 mm/min from a displacement exceeding 50 mm. A measurement temperature was set to four conditions including 25° C., 40° C., 60° C., and 80° C., and the tensile test was performed after leaving the sample in the corresponding temperature environment for one hour. A rupture strength index obtained from the measured rupture strength is illustrated in Table 1. The rupture strength index was calculated by the following calculation formula. The larger the index, the more excellent the rupture strength.

(Rupture strength index)=(Rupture strength in the example)/(Rupture strength in the comparative example)×100

TABLE 1

| Environment temperature (° C.) | 25 | 40 | 60 | 80 |
|---|---|---|---|---|
| Rupture strength index | 123.1 | 124.4 | 119.0 | 204.8 |

The rupture strength used in calculation of the rupture strength index was set to an average value of three measurement values in the example and an average value of four measurement values in the comparative example. From the table, it was confirmed that the rupture strength of the example is greater than the rupture strength of the comparative example in all conditions. In the endless belts of the example, the belt main body was ruptured except for one in the case of 80° C. From this, it is considered that the rupture strength is high because the belt main body and the coupling part are more strongly coupled by a chemical bond in the endless belt of the example. On the other hand, with regard to the endless belts of the comparative example, it is considered that the rupture strength further decreases in comparison to the example because rupture occurs between the belt main body and the joining part in the all cases, and the joining strength between the belt main body and the joining part which are joined to each other by fusion is inferior to the belt main body.

2. Second Embodiment

Figure 9A:
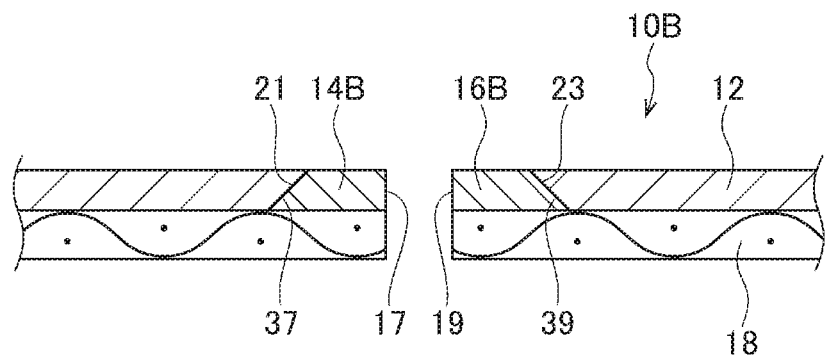
FIG. 9A is a partial cross-sectional view illustrating a band-shaped belt.

Next, a second embodiment will be described with reference to FIGS. 9A to 9C. The same reference numeral will be given to the same configuration as in the first embodiment, and description thereof will be omitted. A band-shaped belt 10B illustrated in FIG. 9A includes a reinforcement fabric 18, a belt main body 12, a first coupling part 14B, and a second coupling part 16B. The first coupling part 14B is joined to a first end surface 37 of the belt main body 12 at a first joining surface 21. The second coupling part 16B is joined to a second end surface 39 of the belt main body 12 at a second joining surface 23. The first joining surface 21 and the second joining surface 23 have a tapered shape of which a thickness decreases as going toward an end part. In the case of this drawing, the first joining surface 21 and the second joining surface 23 have a tapered shape that is inclined in a direction of the reinforcement fabric 18 as going toward the end part.

Figure 9B:
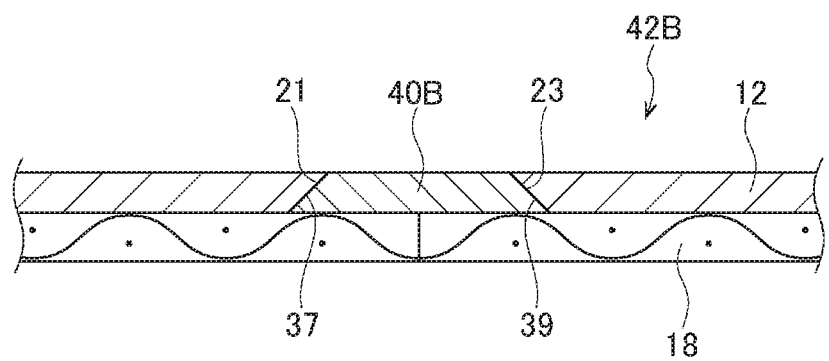
FIG. 9B is a partial cross-sectional view illustrating an endless belt.
Figure 9C:
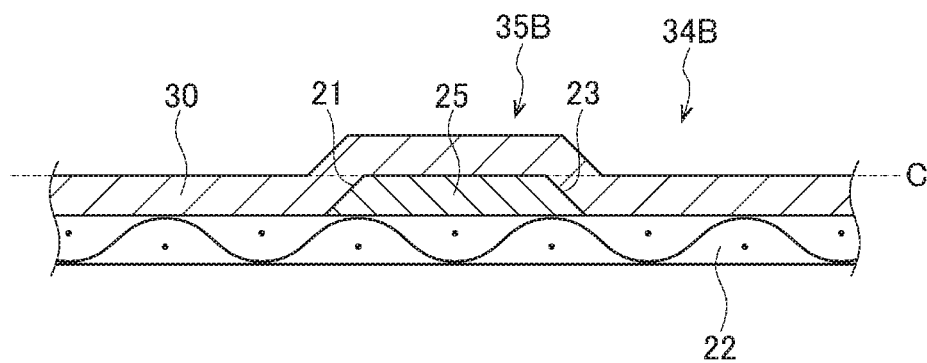
FIG. 9C is a partial cross-sectional view illustrating a vulcanized stacked body in a manufacturing step.

When a first tip end part 17 and a second tip end part 19 are fused and integrated, a coupling part 40B as illustrated in FIG. 9B is formed. The first end surface 37 and the second end surface 39 are coupled through the coupling part 40B, and thus an endless belt 42B is formed.

The band-shaped belt 10B and the endless belt 42B of this embodiment can be manufactured in the same procedure as in the procedure described in the "(Manufacturing Method)" in the first embodiment. That is, a reinforcement sheet serving as the reinforcement fabric 18 is wound on a surface of the cylindrical drum 20 as a mold. Next, a band-shaped thermoplastic resin sheet that is made of the thermoplastic resin and serves as the first coupling part 14B and the second coupling part 16B is disposed on a surface of the reinforcement sheet in an axial direction of the drum. A long side of the band-shaped thermoplastic resin sheet has a tapered shape of which a thickness decreases as going toward an end part, and which is inclined in a reinforcement sheet direction.

Next, the unvulcanized rubber sheet is wound to form an unvulcanized stacked body. Next, the unvulcanized stacked body is vulcanization-molded under heating and pressing conditions. After passage of a predetermined time, cooling is performed to obtain a vulcanized stacked body 34B including a coupling layer 25 solidified from the thermoplastic resin and a belt main body layer 30 solidified from the vulcanized rubber on a reinforcement sheet 22 (FIG. 9C). In the vulcanized stacked body 34B, the unvulcanized rubber sheet is vulcanized by the crosslinking agent, and the vulcanized rubber and the thermoplastic resin are chemically bonded to each other through the crosslinking agent. In the vulcanized stacked body 34B, a protruding ridge 35B that protrudes in a radial direction over an axial direction is formed at a part where the coupling layer 25 is provided.

Next, an outer periphery of the vulcanized stacked body 34B is polished up to a position C in the drawing to remove the protruding ridge 35B. When cutting out the vulcanized stacked body 34B obtained as described above with a predetermined width in an annular shape, a primary endless belt can be obtained. In the primary endless belt, the first end surface 37 and the second end surface 39 of the belt main body 12 are coupled through the coupling part 40B. In the primary endless belt obtained as described above, when the coupling part 40B is cut out in a thickness direction, and the coupling part 40B is separated into the first coupling part 14B and the second coupling part 16B, the band-shaped belt 10B illustrated in FIG. 9A can be obtained.

In the band-shaped belt 10B and the endless belt 42B of this embodiment, since the thermoplastic resin and the vulcanized rubber are chemically bonded to each other, it is possible to obtain the same effect as in the first embodiment. In addition, in the case of this embodiment, since the first joining surface 21 and the second joining surface 23 have a tapered shape that is inclined in a direction of the reinforcement fabric 18 as going toward an end part, a joining area between the first coupling part 14B and the second coupling part 16B, and the first end surface 37 and the second end surface 39 of the belt main body 12 increases. Accordingly, the band-shaped belt 10B and the endless belt 42B can further improve the rupture strength.

In the second embodiment, description has been given of a case where the first joining surface 21 and the second joining surface 23 have a tapered shape that is inclined in a direction of the reinforcement fabric 18 as going toward an end part, but the invention is not limited thereto. The first joining surface 21 and the second joining surface 23 may have a tapered shape in which the inclination direction is opposite to an aspect illustrated in FIGS. 9A to 9C, that is, a tapered shape that is inclined in a direction spaced away from the reinforcement fabric 18 as going toward an end part. In this case, a long side of the band-shaped thermoplastic resin sheet that is used in a manufacturing process has a tapered shape of which a thickness decreases as going toward an end part and which is inclined in a direction spaced away from the reinforcement sheet. A long side of the unvulcanized rubber sheet is set as a tapered shape that is complementary to the long side of the thermoplastic resin sheet. That is, the long side of the unvulcanized rubber sheet is a tapered shape of which a thickness decreases as going toward an end part, and which is inclined in a reinforcement sheet direction. When the thermoplastic resin sheet is disposed between long sides of the unvulcanized rubber sheet, and vulcanization-molding is performed under heating and pressing conditions, the vulcanized rubber and the thermoplastic resin sheet are chemically coupled to each other, and thus a vulcanized stacked body is obtained. The vulcanized stacked body is cut out with a predetermined width in an annular shape to obtain a primary endless belt. In the band-shaped belt and the endless belt obtained as described above, a joining area between the first end surface and the second end surface of the belt main body increases, and thus it is possible to obtain the same effect as in the second embodiment.

3. Third Embodiment

Figure 10A:
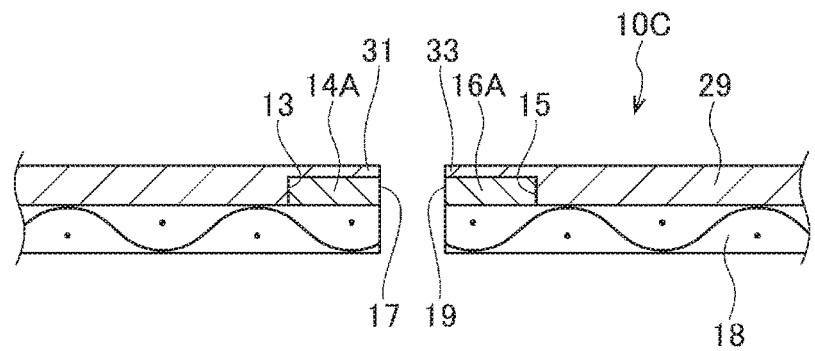
FIG. 10A is a partial cross-sectional view illustrating a band-shaped belt.

Next, a third embodiment will be described with reference to FIGS. 10A to 10C. The same reference numeral will be given to the same configuration as in the first embodiment, and description thereof will be omitted. A band-shaped belt 10C illustrated in FIG. 10A includes reinforcement fabric 18, a belt main body 29, a first coupling part 14A, and a second coupling part 16A. With regard to one end of the belt main body 29, a first end surface 13 that is in contact with an end part of the first coupling part 14A, and a first extension part 31 that extends as a part of the belt main body 29 to cover a surface (a surface on one side) of the first coupling part 14A which is opposite to a surface that is in contact with the reinforcement fabric 18 are formed. With regard to the other end of the belt main body 29, a second end surface 15 that is in contact with an end part of the second coupling part 16A, and a second extension part 33 that extends as a part of the belt main body 29 to cover a surface (a surface on one side) opposite to a surface of the second coupling part 16A which is in contact with the reinforcement fabric 18 are formed.

Figure 10B:
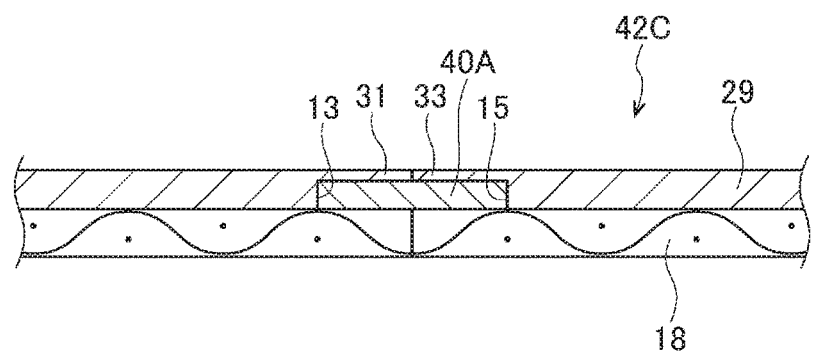
FIG. 10B is a partial cross-sectional view illustrating an endless belt.
Figure 10C:
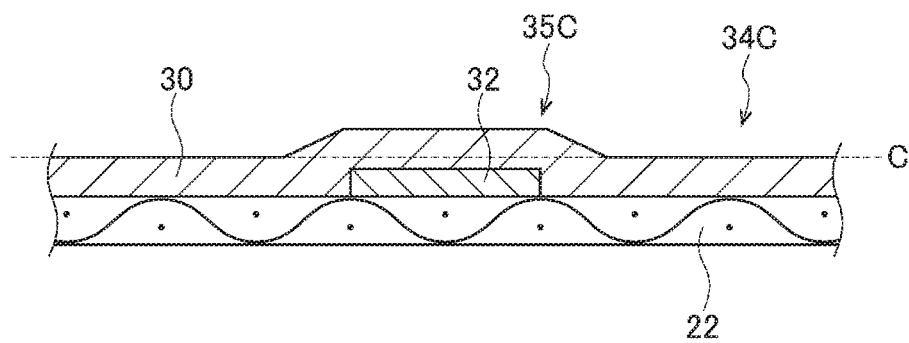
FIG. 10C is a partial cross-sectional view illustrating a vulcanized stacked body in a manufacturing step.

When a first tip end part 17 and a second tip end part 19 are fused and integrated, a coupling part 40A illustrated in FIG. 10B is formed. The one end including the first end surface 13 and the other end including the second end surface 15 are coupled through the coupling part 40A, and thus an endless belt 42C is formed. Tip ends of the first extension part 31 and the second extension part 33 are in contact with each other.

The band-shaped belt 10C and the endless belt 42C of this embodiment can be manufactured in the same procedure as in the procedure described in the "(Manufacturing Method)" in the first embodiment. That is, a reinforcement sheet serving as the reinforcement fabric 18 is wound on a surface of a cylindrical drum as a mold. Next, a band-shaped thermoplastic resin sheet that is made of the thermoplastic resin and serves as the first coupling part 14A and the second coupling part 16A is disposed on a surface of the reinforcement sheet in an axial direction of the drum. The thickness of the band-shaped thermoplastic resin sheet is smaller than the thickness of the unvulcanized rubber sheet.

Next, the unvulcanized rubber sheet is wound to form an unvulcanized stacked body. Next, the unvulcanized stacked body is vulcanization-molded under heating and pressing conditions. After passage of a predetermined time, cooling is performed to obtain a vulcanized stacked body 34C including a coupling layer 32 solidified from the thermoplastic resin and a belt main body layer 30 solidified from the vulcanized rubber on the reinforcement sheet 22 (FIG. 10C). In the vulcanized stacked body 34C, the unvulcanized rubber sheet is vulcanized by the crosslinking agent, and the vulcanized rubber and the thermoplastic resin are chemically bonded to each other through the crosslinking agent. In the vulcanized stacked body 34C, a protruding ridge 35C that protrudes in a radial direction over an axial direction is formed at a part where the coupling layer 32 is provided.

Next, an outer periphery of the vulcanized stacked body 34C is polished up to the position C in the drawing to remove the protruding ridge 35C. When cutting out the vulcanized stacked body 34C obtained as described above with a predetermined width in an annular shape, a primary endless belt can be obtained. In the primary endless belt, the one end including the first end surface 13 of the belt main body 29 and the other end including the second end surface 15 are coupled through the coupling part 40A. In the primary endless belt obtained as described above, when the coupling part 40A is cut out in a thickness direction, and the coupling part 40A is separated into the first coupling part 14A and the second coupling part 16A, the band-shaped belt 10C illustrated in FIG. 10A can be obtained.

In the band-shaped belt 10C and the endless belt 42C of this embodiment, since the thermoplastic resin and the vulcanized rubber are chemically bonded to each other, it is possible to obtain the same effect as in the first embodiment. In addition, in the case of this embodiment, since the first extension part 31 and the second extension part 33 respectively cover surfaces of the first coupling part 14A and the second coupling part 16A which are opposite to the surfaces in contact with the reinforcement fabric 18, and are chemically bonded to the surfaces, it is possible to restrain the occurrence of cracks in joining surfaces between the first end surface 13 and the second end surface 15 of the belt main body 29 and the coupling part 40A. Accordingly, the band-shaped belt 10C and the endless belt 42C can improve bending resistance. In addition, when combining this embodiment and the second embodiment, it is possible to obtain a band-shaped belt and an endless belt which have the bending resistance and the rupture strength.

4. Modification Example

The invention is not limited to the above-described embodiments, and modifications can be appropriately made in a range of the gist of the invention.

Figure 11:
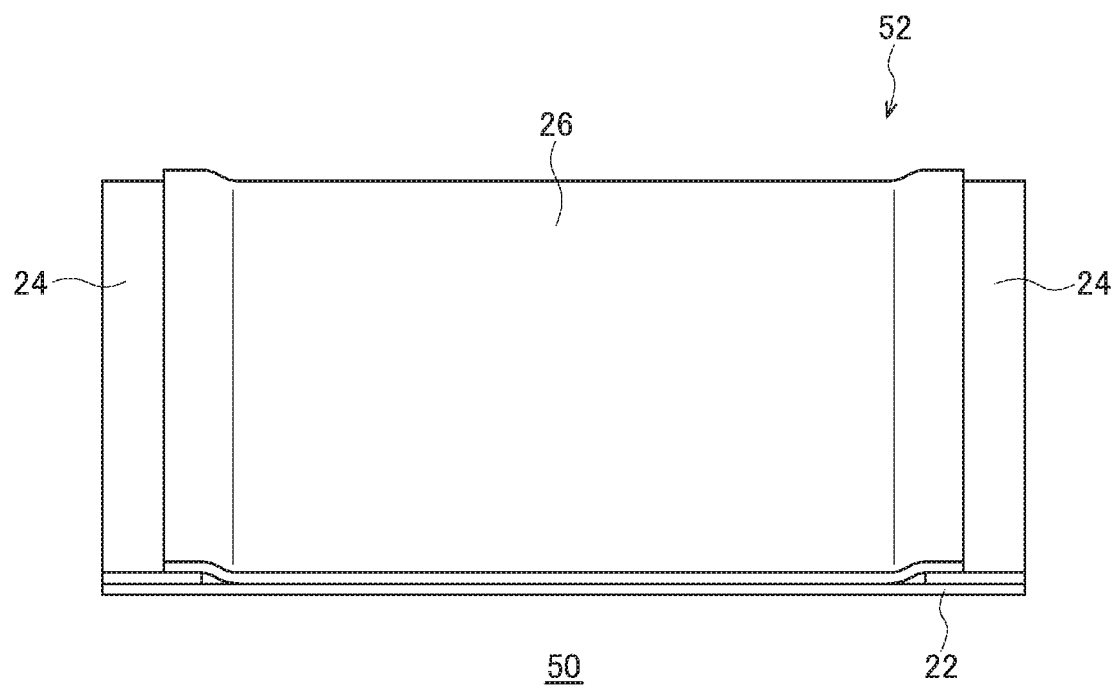
FIG. 11 is a perspective view illustrating a modification example of the method for manufacturing the band-shaped belt according to the first embodiment.

In the above-described embodiments, description has been given of a case where the primary endless belt is prepared, and the primary endless belt is formed as the band-shaped belts 10A, 10B, and 10C, but the invention is not limited thereto. As illustrated in FIG. 11, the band-shaped belts 10A, 10B, and 10C may be formed by using a flat mold 50 as the mold. In the case of this drawing, a reinforcement sheet 22 is laid on a surface of the flat mold 50, a band-shaped thermoplastic resin sheet 24 is disposed on both end parts of the reinforcement sheet 22, and an unvulcanized rubber sheet 26 is superimposed thereon, thereby obtaining an unvulcanized stacked body 52 in a flat plate shape. Next, the unvulcanized stacked body 52 is heated, and is vulcanization-molded to obtain a vulcanized stacked body (not illustrated). Next, protruding ridges formed on both end parts of the vulcanized stacked body are removed through polishing. When cutting out the vulcanized stacked body obtained as described above with a predetermined width in a band shape, the band-shaped belt 10A (FIG. 1) can be obtained. When a long side of the thermoplastic resin sheet 24 is set to a tapered shape of which a thickness decreases as going toward an end part and which is inclined in a reinforcement sheet direction, the band-shaped belt 10B (FIG. 9A) can be obtained. In addition, when the thickness of the thermoplastic resin sheet 24 is set to be smaller than the thickness of the unvulcanized rubber sheet, the band-shaped belt 10C (FIG. 10A) can be obtained. In the band-shaped belts 10A, 10B, and 10C which are formed without through the primary endless belt as in this modification example, when fusing the first coupling part 14A or 14B, and the second coupling part 16A or 16B, the endless belt 42A, 42B, or 42C can be obtained.

In the above-described embodiments, description has been given of a case where the primary endless belt is used as the band-shaped belts 10A, 10B, and 10C, but the invention is not limited thereto. In a case where there is enough time to replace the endless belt, for example, the conveyance device may be detached from the automatic ticket gate, and a used endless belt may be replaced with the primary endless belt.

In the above-described embodiments, description has been given of a case where the end parts of the unvulcanized rubber sheet 26 are disposed to be superimposed on the end parts in a width direction of the thermoplastic resin sheet 24 in a thickness direction. However, the invention is not limited thereto, and end surfaces of the end parts may be brought into contact with each other.

In the above-described embodiments, description has been given of a case where the band-shaped belts 10A, 10B, and 10C, and the endless belts 42A, 42B, and 42C include the reinforcement fabric. However, the invention is not limited thereto, and the reinforcement fabric 18 may be omitted.

REFERENCE SIGNS LIST

10A, 10B, 10C Band-shaped belt
12, 29 Belt main body
13 First end surface
14A, 14B First coupling part
15 Second end surface
16A, 16B Second coupling part
17 First tip end part
18 Reinforcement fabric
19 Second tip end part
20 Drum (mold)
22 Reinforcement sheet
24 Thermoplastic resin sheet
26 Unvulcanized rubber sheet
28 Unvulcanized stacked body
34A, 34B, 34C Vulcanized stacked body
38 Endless belt
40A, 40B Coupling part
42A, 42B, 42C Endless belt
50 Flat mold (mold)
52 Unvulcanized stacked body

The invention claimed is:

1. An endless belt, comprising:
   a band-shaped belt main body made of a vulcanized rubber; and
   a coupling part that is made of a thermoplastic resin and is provided between both end parts of the belt main body, wherein
   the vulcanized rubber of the both end parts of the belt main body and the thermoplastic resin of the coupling part are chemically bonded to each other through a crosslinking agent, wherein
   the vulcanized rubber and the thermoplastic resin are chemically bonded to each other through the crosslinking agent by vulcanization-molding the thermoplastic resin and an unvulcanized rubber including the crosslinking agent, wherein the crosslinking agent covalently bonds to the unvulcanized rubber and the thermoplastic resin.

2. The endless belt according to claim 1, wherein
   both joining surfaces of the coupling part which are in contact with the belt main body have a tapered shape that is inclined with respect to a thickness direction of the belt main body.

3. The endless belt according to claim 1, wherein
   parts of the belt main body extend on a surface on one side of the coupling part.

4. The endless belt according to claim 1, wherein
   the endless belt further comprises reinforcement fabric, the belt main body and the coupling part are provided on a surface of the reinforcement fabric.

5. The endless belt according to claim 1, wherein
   in the case of applying a tensile load in a longitudinal direction of the endless belt, the belt main body is ruptured earlier than a part between an end part of the belt main body and the coupling part.

6. A band-shaped belt, comprising:
   a band-shaped belt main body made of a vulcanized rubber;
   a first coupling part that is made of a thermoplastic resin and is provided on a first end surface that is one end of the belt main body in a longitudinal direction to extend in the longitudinal direction of the belt main body; and
   a second coupling part that is made of a thermoplastic resin and is provided on a second end surface that is the other end of the belt main body in the longitudinal direction to extend in the longitudinal direction of the belt main body, wherein
   the vulcanized rubber of the first end surface and the thermoplastic resin of the first coupling part are chemically bonded to each other through a crosslinking agent, and the vulcanized rubber of the second end surface and the thermoplastic resin of the second coupling part are chemically bonded to each other through a crosslinking agent, wherein
   the vulcanized rubber and the thermoplastic resin are chemically bonded to each other through the crosslinking agent by vulcanization-molding the thermoplastic resin and an unvulcanized rubber including the crosslinking agent, wherein the crosslinking agent covalently bonds to the unvulcanized rubber and the thermoplastic resin.

7. The band-shaped belt according to claim 6, wherein a joining surface of the first coupling part which is in contact with the first end surface, and a joining surface of the second coupling part which is in contact with the second end surface have a tapered shape that is inclined with respect to a thickness direction of the belt main body.

8. The band-shaped belt according to claim 6, wherein parts of the belt main body extend on surfaces on one side of the first coupling part and the second coupling part.

9. The band-shaped belt according to claim 6, wherein the band-shaped belt further comprises reinforcement fabric, the belt main body, the first coupling part, and the second coupling part are provided on a surface of the reinforcement fabric.

10. A method for manufacturing a band-shaped belt, comprising:
   a stacked body forming process of disposing a band-shaped thermoplastic resin sheet that is made of a thermoplastic resin and serves as a coupling part, and an unvulcanized rubber sheet that includes an unvulcanized rubber and a crosslinking agent covalently bonded to the unvulcanized rubber and the thermoplastic resin and serves as a belt main body on a mold surface in a state in which end parts are in contact with each other to obtain an unvulcanized stacked body; and
   a vulcanization-molding process of vulcanization-molding the unvulcanized stacked body wherein the vulcanized rubber vulcanized from the unvulcanized rubber and the thermoplastic resin are chemically bonded to each other through the crosslinking agent at the end parts during the vulcanization-molding process.

11. The method for manufacturing a band-shaped belt according to claim 10, further comprising:
   a polishing process of polishing a surface of a vulcanized stacked body obtained in the vulcanization-molding process.

12. The method of manufacturing a band-shaped belt according to claim 10, wherein
in the stacked body forming process, the thermoplastic resin sheet and the unvulcanized rubber sheet are disposed on a reinforcement sheet serving as reinforcement fabric disposed on the mold surface on the same surface on the reinforcement sheet in a state in which the end parts are in contact with each other.

13. The method for manufacturing a band-shaped belt according to claim 10, wherein
   the coupling part includes a first coupling part that is provided in one end of the belt main body, and a second coupling part that is provided in the other end of the belt main body.

14. A method of manufacturing an endless belt, comprising:
   a band-shaped belt manufacturing step, comprising:
      a stacked body forming process of disposing a band-shaped thermoplastic resin sheet that is made of a thermoplastic resin and serves as a coupling part, and an unvulcanized rubber sheet that includes an unvulcanized rubber and a crosslinking agent covalently bonded to the unvulcanized rubber and the thermoplastic resin and serves as a belt main body on a mold surface in a state in which end parts are in contact with each other to obtain an unvulcanized stacked body, wherein the coupling part includes a first coupling part that is provided in one end of the belt main body, and a second coupling part that is provided in the other end of the belt main body; and
      a vulcanization-molding process of vulcanization-molding the unvulcanized stacked body wherein the vulcanized rubber vulcanized from the unvulcanized rubber and the thermoplastic resin are chemically bonded to each other through the crosslinking agent at the end parts during the vulcanization-molding process; and
   an endless belt manufacturing step, comprising:
      a process of mounting the band-shaped belt manufactured in the band-shaped belt manufacturing step on a conveyance device, and fusing the first coupling part and the second coupling part into an endless shape.

\* \* \* \* \*